United States Patent Office 3,312,319
Patented Apr. 4, 1967

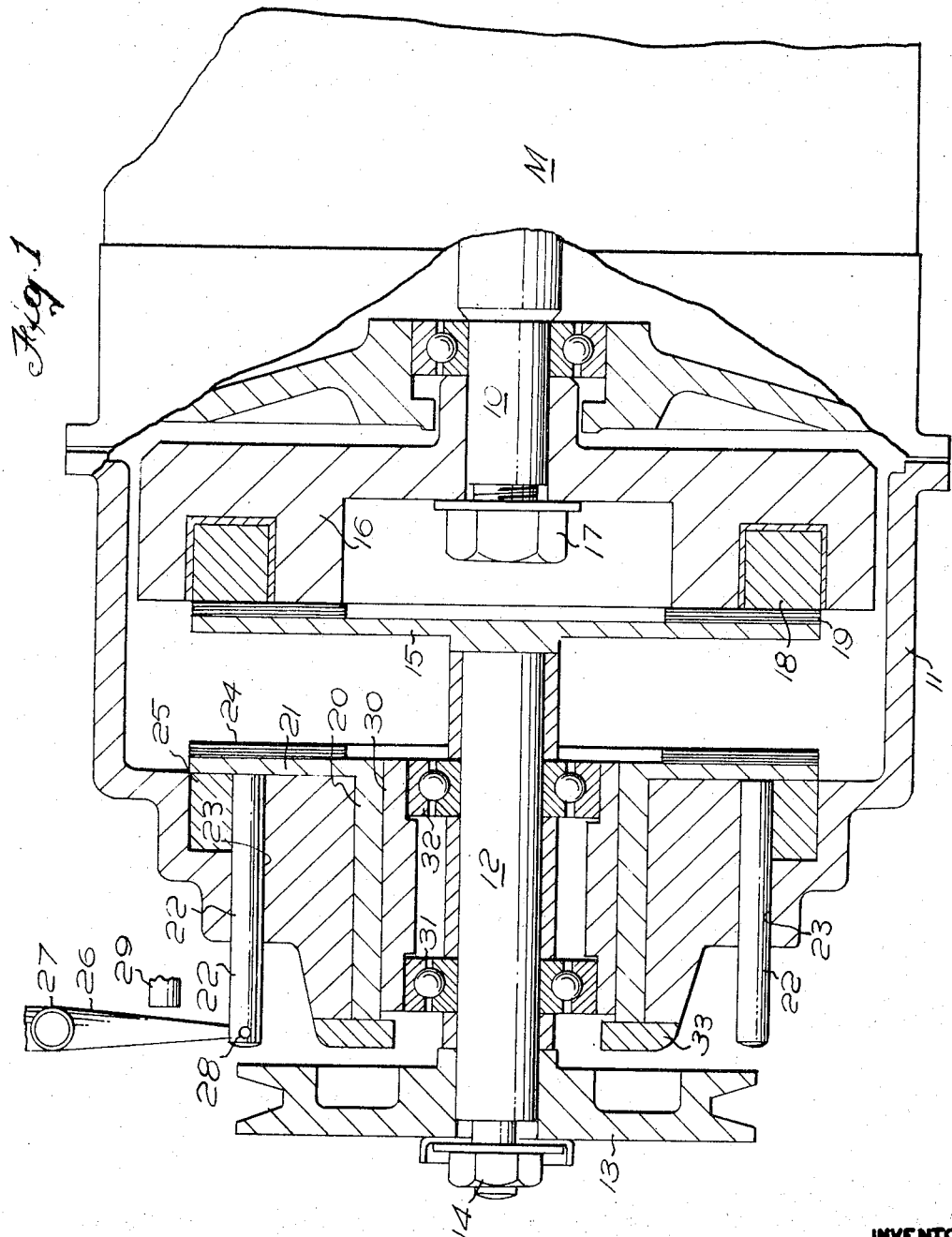

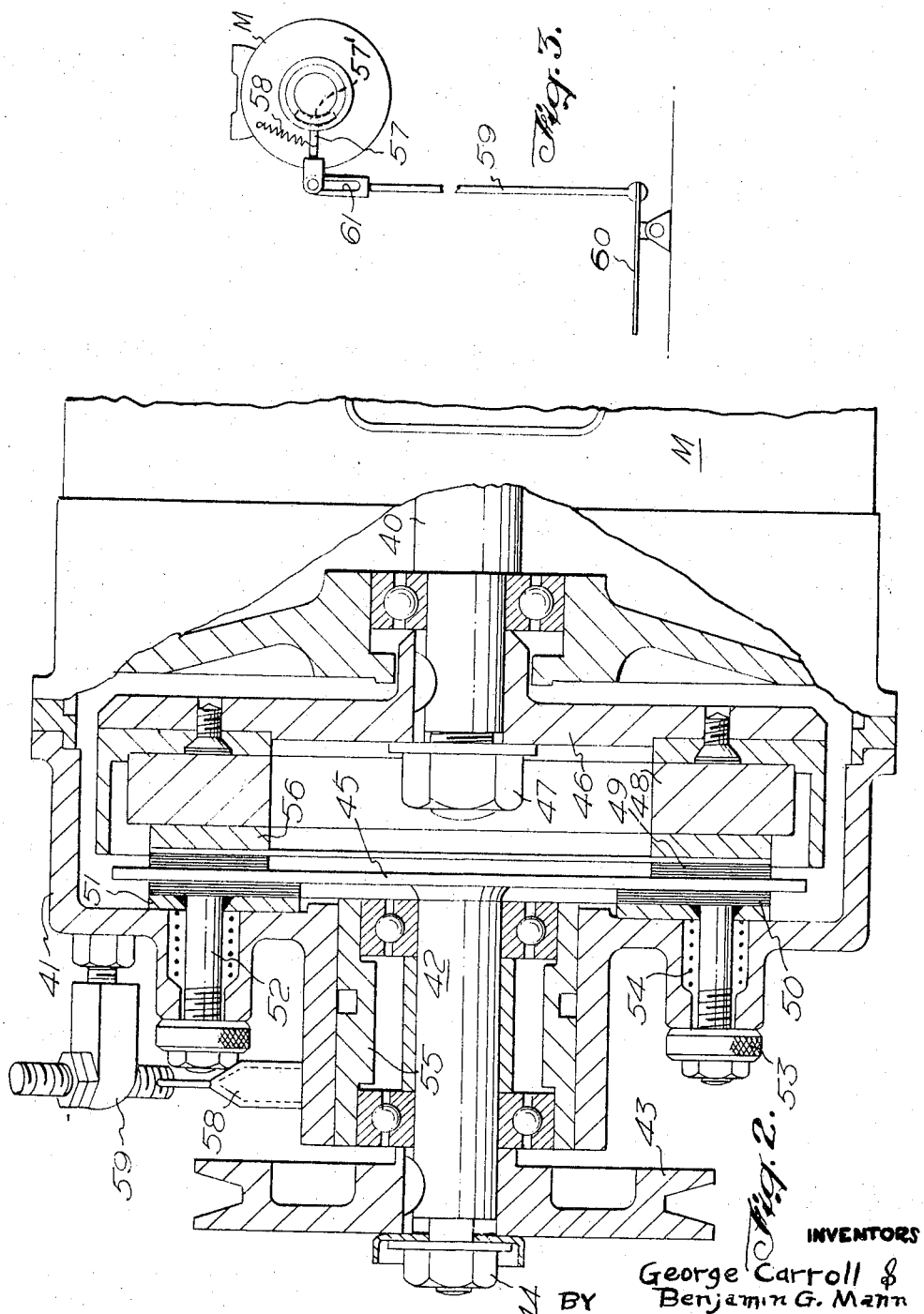

3,312,319
PERMANENT MAGNET OPERATED CLUTCH
AND BRAKE
George Carroll, Stockport, and Benjamin Gordon Mann, Bramhall, England, assignors to The Marine Engineering Company (Stockport) Ltd., a corporation of Great Britain and Northern Ireland
Filed Dec. 14, 1964, Ser. No. 418,250
Claims priority, application Great Britain, Dec. 14, 1963, 49,486/63
9 Claims. (Cl. 192—18)

This invention concerns mechanical apparatus of the kind (hereinafter termed of the kind referred to) including a shaft carrying a first member, a second member, means for causing relative movement between said members from a first position wherein they are displaced from one another, to a second position where they make contact with one another, whereby the state of rest or rotation of said second member may be transmitted to said shaft via said first member, for example a clutch or brake.

According to the present invention mechanical apparatus of the kind referred to is characterised in that said first member is at least partially formed from a ferrous material, and in that said second member includes a permanently magnetised portion, whereby movement of said members into said second position is servo-assisted and cohesion therebetween in said second position is effected, by magnetic attraction.

The invention will be further apparent from the following description with reference to the accompanying drawings, which show, by way of example only, two types of clutch brake motor embodying the invention.

Of the drawings:

FIG. 1 shows a central axial cross-section through the first type of clutch brake motor;

FIG. 2 shows a central axial cross-section through the second type of clutch brake motor; and FIG. 3 shows an end view of the clutch brake motor of FIG. 2, together with its associated control equipment and seen in the direction of the arrow III on FIG. 2.

Referring now to FIGURE 1, it will be seen that the unit comprises an electric motor generally designated by the reference M, having a driving shaft 10.

A bell-shaped housing 11 is provided and is secured to the motor casing at one end thereof. A further shaft 12, which is adapted to be driven from the shaft 10, in a manner to be described hereinafter, is provided, and extends through the bell-shaped housing 11 at the end thereof remote from the motor M. The shaft 12 carries a pulley 13 on its free end, which is secured thereto by means of a nut 14. The shaft 12 is provided with a circular clutch plate 15 which is secured to the end thereof adjacent the motor M, the clutch plate 15 being formed from mild steel.

A fly-wheel 16 is provided within the housing 11 and is secured by means of a nut 17 onto the end of the shaft 10 of the motor M. The fly-wheel 16 is provided with an annular recess on its outwardly directed circular face, in which recess is located an annular permanent magnet 18 which is formed from the material known as Feroba II, which is a barium-iron alloy and an annular plate 19 of friction material is secured to the front plate of the flywheel 16 so as to cover the exposed surface of the magnet 18.

A cylindrical sleeve 20 having an outwardly directed flange 21 is provided and is mounted concentrically with the shaft 12 within the housing 11 at the end thereof remote from the motor M, in such a manner that it is free to slide axially therein. The flange 21 carries studs 22 which project therefrom on the opposite face thereof from the motor M, and which slidably engage bore holes 23 provided in the housing 11. A further annular plate 24 of friction material is provided, and is secured to the flange 21 over the face thereof which is directed towards the motor M.

A further annular permanent magnet 25, formed from the material known as Feroba II is provided and is secured to the flange 21 on the face thereof opposite from the annular plate 24 of friction material.

The assembly comprising sleeve 20, flange 21, studs 22 annular plate 24 and magnet 25 may be moved axially through the housing 11 from a first position (as seen in the drawing) wherein the face of the flange 21 remote from the motor M contacts the inside wall of the end of the housing 11 with the magnet 25 located in an annular recess provided therein, and wherein the annular plate 24 of friction material is widely spaced from the flywheel 16, to a second position wherein the annular plate 24 of friction material is considerably closer to the flywheel 16.

A lever 26, which is pivoted at 27 is provided, and is pivotally connected at 28 to the end of one of the studs which projects through the end wall of the housing 11. Operation of the lever 26 enables the assembly just described to be moved from its first position to its second position or vice-versa, a stop 29, which is arranged to co-operate with the lever 26, being provided, to limit the travel of the assembly towards the flywheel 16 and to define the second position aforesaid.

The shaft 12 is carried by a cylindrical bearing block 30, which includes ball races 31 and 32, the cylindrical bearing block 30 being slidably located within the cylindrical sleeve 20.

The shaft 12 together with the clutch plate 15 is free for axial movement within the housing 11, the limits of movement being determined in one direction by engagement of the clutch plate 15 with the annular plate 19 of friction material, and in the other direction by engagement of the cylindrical bearing block 30 with the end wall portion 33 of the bell-shaped housing 11.

The magnets 18 and 25 are of equal power, and the thickness of the annular plate 19 of friction material measured in an axial direction is appreciably greater than that of the annular plate 24 of friction material.

The operation of the unit will now be described.

In use, the electric motor M drives the flywheel 16 together with the parts secured thereto continuously and in a first condition of the unit (which is the condition illustrated in the drawing) the clutch plate 15 engages the annular plate 19 of friction material, the drive from the motor M thereby being transmitted to the pulley 13 via the shaft 12. Cohesion between the clutch plate 15 and the annular plate 19 of friction material is ensured by the magnetic forces existing between the clutch plate 15 and the annular magnet 18.

When it is desired to remove the driving connection and brake the pulley 13, the lever 26 is actuated so as to move the flange 21, together with the parts secured thereto towards the clutch plate 15. The effort required on the lever 26 for this operation is very small, the arrangement being such that as soon as the flange 21 has been moved a short distance towards the clutch plate 15, the movement becomes servo-assisted due to the attraction between the magnets 18 and 25, the small initial manual movement being necessary to bring the magnets 18 and 25 sufficiently close so that the forces of attraction therebetween overcome the frictional forces resisting the movement of the assembly. The second position of the assembly which is determined by the stop 29, is accurately set so that when the assembly reaches this position the annular plate 24 of friction material lies very close to the face of the clutch plate 15 facing away from the motor M, and so that the clutch plate 15 is pulled away from the annular plate 19 of friction material and onto the stationary annular plate 24 of friction material carried by the flange 21, under the action of the magnetic attraction existing between the magnet 25 and clutch plate 15, whereby the rotary movement of the clutch plate 15, shaft 12 and pulley 13 is arrested.

It will be appreciated that the difference in thickness between the annular plates 19 and 24 of friction material is necessary to enable the operation just described to take place by enabling a clearance to exist between the annular plate 24 and clutch plate 15 when the former is at its second position whilst at the same time allowing the magnet 25 to attract the clutch plate 15 with a greater force than the attraction between the clutch plate 15 and magnet 18.

In order to return to a driving connection between the motor M and pulley 13, it is necessary to operate the lever 26 so as to move the flange 21 together with the magnet 25 away from the flywheel 16, and since the clutch plate 15 is not free to move by more than a very limited extent with the magnet 25, the connection therebetween is broken, and the clutch plate 15 returns to its position wherein it makes contact with the annular plate 19 of friction material, under the action of the magnet 18.

It will be appreciated that in the example just described, the magnets perform two functions, firstly, they effect cohesion between the clutch plate and the annular plates of friction material to be associated therewith in the driving and braking conditions and secondly they act so as to servo-assist the operation of the unit to change between such conditions.

Referring to FIGS. 2 and 3 of the drawings, it will be seen that the unit comprises an electric motor generally designated by the reference M, having a driving shaft 40.

A bell-shaped housing 41 is provided and is secured to the motor casing at one end thereof. A further shaft 42, which is adapted to be driven from the shaft 40 in a manner to be described hereinafter is provided and extends through the bell shaped housing 41 at the end thereof remote from the motor M. The shaft 42 carries a pulley 43 on its free end, which is secured by means of a nut 44. The shaft 42 is provided with a circular clutch plate 45 which is secured to the end thereof adjacent the motor M the clutch plate 45 being formed from mild steel.

A flywheel 46 is provided within the housing 41 and is secured by means of a nut 47 onto the end of the shaft 40 of the motor M. The flywheel 46 carries an annular permanent magnet 48, which is formed from the material known as Feroba II on the face thereof which is directed away from the motor M.

An annular plate of friction material forming a clutch lining 49 is secured to the face of the clutch plate 45 which is directed towards the motor M, and a further annular plate of friction material forming a brake lining 50 is provided and secured on the opposite face of the clutch plate 45.

An annular steel plate 51 is disposed over the end wall of the bell-shaped housing 41 in such a manner that its face is directed towards the motor M. The plate 51 is restrained from rotational movement by virtue of studs 52 which extend from the face of the plate 51 remote from the motor M and which are located in suitable bores provided in the housing 41. The studs 52 carry nut means 53 on their free ends which co-operate with an external face of the housing 41 under the action of compression springs 54 surrounding the studs 52 and working between an interior surface of the housing and the face of the plate 51 remote from the motor M. It will be appreciated that the nut means 53 may be adjusted to set the face of the plate 51 which is directed towards the motor M at an accurate axial position.

The shaft 42 is journalled in bearings in a sleeve 55 which is axially slidable within the bell-shaped housing 41 between a first position wherein the brake lining 50 is in contact with the surface of the plate 51 directed towards the motor M and a second position wherein the clutch lining 49 is in contact with the surface of a keeper plate 56 remote from the motor M, which keeper plate 56 extends over the surface of the permanent magnet 48 directed away from the motor M.

A peg 57 (see FIG. 3) is provided and is secured by one of its ends to the sleeve 55 in such a manner that it extends outwardly therefrom in a radial direction. The peg 57 passes through a helical groove or slot 57′ provided in that part of the housing 41 which surrounds the sleeve 55. It will be appreciated that the peg 57 may be moved in such a manner as to cause the sleeve 55, by the inter action of the peg with the helical groove, to move axially within the housing 41 so as to move the clutch plate 45 between each of the two positions described above.

A tension spring 58 is provided and mounted between a fixture 59 on the outside of the housing 41 and the peg 57, the spring 58 serving to urge the peg 57 in such a direction as to hold the sleeve in said first position wherein the brake lining 50 engages the plate 51.

The peg 57 is pivotally connected with linkage means 59 which is itself pivotally connected with a foot pedal 60. The pivot pin between the pegs 57 and the linkage means 59 passes through an elongated opening 61 in the linkage means 59, for a purpose which will be apparent hereinafter.

In use, the foot pedal 60 may be operated to actuate the peg 57 to move the sleeve from the first position (as shown in FIG. 2) to the second position. The movement takes place against the action of the spring 58, but is servo-assisted inasmuch as that as soon as the clutch plate 45 has moved by a small amount towards the flywheel 56 the magnetic attraction between the permanent magnet 48 and the clutch plate 45 overcomes the action of the spring 58 to complete the movement automatically. In the second position, the clutch lining 49 is held in firm engagement with the keeper plate 56 by virtue of the magnetic attraction which ensures cohesion between these parts and enables the drive from the motor shaft 40 to be transmitted to the shaft 42 and hence pulley 43. In order to disengage the drive, and brake the shaft 42 it is necessary to operate the foot pedal 60, and the elongated opening 61 enables the foot pedal to be operated in such a manner that the linkage means 59 delivers a small impact to the peg 57 to tend to move the sleeve back to the first position. This impact causes separation of the clutch lining 49 from the keeper plate 56 with the result that the clutch plate 45 becomes sufficiently spaced from the permanent magnet 48 as to allow the spring 58 to act on the peg 57 to cause the sleeve to complete the movement to the first position, whereat the brake lining 50 engages the plate 51 to cause the rotary movement of the shaft 42 and hence pulley 43 to be arrested.

It will be appreciated that it is not intended to limit the invention to the above examples only, many variations such as might readily occur to one skilled in the art, being possible, without departing from the scope thereof.

Thus, the principles of the invention may be embodied in any mechanical apparatus of the kind referred to other than clutch brake motors.

For example a braking disc having a permanent magnet associated therewith may be provided for a motor whose shaft carries a plate which is attracted by the magnet onto the braking disc, but which is held away from same by a solenoid adapted to operate with the motor. Under these conditions, when the power supplied to the motor is cut, that to the solenoid is also cut, and the plate, becomes free to move towards and engage the braking disc, thereby reducing the run-down time of the motor to a very considerable extent.

What is claimed is:

1. A clutch brake motor comprising a motor, a first shaft permanently connected with said motor and adapted to be driven thereby, a first clutch part secured to said first shaft, a permanent magnet incorporated with said first clutch part, a brake part secured against rotational movements and disposed opposite said first clutch part in spaced relationship therefrom, a second shaft mounted in line with said first shaft, a second clutch part secured to said second shaft and disposed between said first clutch part and said brake part and formed from ferrous material and means for moving said second clutch part from a first position wherein one face thereof engages said brake part to a second position wherein the opposite face thereof engages said first clutch part, whereby movement from said first position to second position is servo-assisted by virtue of magnetic attraction, and including a sleeve, bearings between said sleeve and said second shaft, a housing in which said sleeve is rotatably and slidably mounted, a helical slot in said housing, a peg secured to said sleeve and extending therefrom in a radial direction and passing through said slot whereby movement of said peg causes axial movement of said sleeve and hence said second clutch part between said first and second positions.

2. A clutch brake motor according to claim 1 including spring means acting on said peg so as to urge said second clutch part into said first position, said spring means being of insufficient strength to overcome the magnetic forces holding said second clutch part in cohesion with said first clutch part when the former is in said second position.

3. A clutch brake motor according to claim 2 including a linkage for actuation of said peg.

4. A clutch brake motor according to claim 3 wherein said linkage is so arranged as to be capable of operation to impart an impact to said peg tending to move same to cause movement of said second clutch part to said first position.

5. A clutch brake motor according to claim 4 including a clutch lining and a brake lining disposed on opposite sides of said second clutch part.

6. A clutch brake motor comprising a motor, a first shaft permanently connected with said motor and adapted to be driven thereby, a first clutch part secured to said first shaft, a permanent magnet incorporated with said first clutch part, a brake part secured against rotational movements and disposed opposite said first clutch part in spaced relationship therefrom, a second shaft mounted in line with said first shaft, a second clutch part secured to said second shaft and disposed between said first clutch part and said brake part and formed from ferrous material and means for moving said second clutch part from a first position wherein one face thereof engages said brake part to a second position wherein the opposite face thereof engages said first clutch part, whereby movement from said first position to said second position is servo-assisted by virtue of magnetic attraction, and including a further permanent magnet of equal strength to said first mentioned permanent magnet incorporated with said brake part, a sleeve secured to said brake part, bearings between said sleeve and said second shaft, said second shaft being axially slidable in said sleeve, and a housing in which said sleeve is slidably mounted, means for effecting axial movement of said sleeve and hence said brake part, a clutch lining secured to said first clutch part, and a brake lining secured to said brake part, said clutch lining being of greater thickness than said brake lining, and stop means to limit the axial movement of said second shaft and hence said second clutch part away from said first clutch part, whereby axial movement of said sleeve and hence said brake part can be made to effect movement of said second clutch part from a first position wherein said second clutch part engages said brake lining to a second position wherein said second clutch part engages said clutch lining and vice-versa.

7. A clutch-brake comprising a housing, a motor having a shaft, a first clutch part fixed on the free end of said shaft, a first permanent magnet in the outer face of said first clutch part, a driven shaft axially alined with said motor shaft, the free end of said driven shaft having a second clutch part, the latter having two faces one of which is adjacent to said first clutch part, a brake part in said housing mounted for axial movement only about said driven shaft, a second permanent magnet in the face of said brake part adjacent to said second clutch part, said second clutch part and said driven shaft being slidably mounted in said housing, whereby when said brake part is slid toward said first clutch part, the magnetic attraction of said second magnet overcomes the attraction of said first magnet and draws said second clutch part away from said first clutch part.

8. A clutch-brake according to claim 7 wherein each of said magnets is annular.

9. A clutch-brake according to claim 7 wherein friction material is placed on the faces of said magnets, the thickness of the material on said second magnet is greater than that on said first magnet.

References Cited by the Examiner
UNITED STATES PATENTS

| | | | |
|---|---|---|---|
| 2,612,248 | 9/1952 | Feiertag. | |
| 2,823,776 | 2/1958 | Pierce | 192—84 X |
| 2,962,143 | 11/1960 | Heinemann. | |
| 3,197,003 | 7/1965 | Yetter | 192—84 |

BENJAMIN W. WYCHE, III, *Acting Primary Examiner.*

DAVID J. WILLIAMOWSKY, *Examiner.*